C. A. IFFERT.
GEOGRAPHIC MATHEMATICAL APPARATUS.
APPLICATION FILED MAR. 16, 1908.

916,874.

Patented Mar. 30, 1909.
3 SHEETS—SHEET 1.

C. A. IFFERT.
GEOGRAPHIC MATHEMATICAL APPARATUS.
APPLICATION FILED MAR. 16, 1908.

916,874.

Patented Mar. 30, 1909.
3 SHEETS—SHEET 2.

Witnesses

Inventor
Charles A. Iffert.
By C. A. Snow & Co.
Attorneys

UNITED STATES PATENT OFFICE.

CHARLES ALBERT IFFERT, OF MONROE, WISCONSIN.

GEOGRAPHIC-MATHEMATICAL APPARATUS.

No. 916,874.  Specification of Letters Patent.  Patented March 30, 1909.

Application filed March 16, 1908. Serial No. 421,501.

*To all whom it may concern:*

Be it known that I, CHARLES ALBERT IFFERT, a citizen of the United States, residing at Monroe, in the county of Green and State of Wisconsin, have invented a new and useful Geographic-Mathematical Apparatus for Use in Schools and Homes, of which the following is a specification.

This invention relates to apparatus of that general type employed in teaching geography and the relation between longitude and time, and has for its principal object to provide an apparatus of simple construction by which the distance between different degrees of longitude or latitude may be accurately computed, and the positions of various cities taught in such manner as to become fixed in the mind of the pupil.

A further object of the invention is to provide a means which will readily show the difference in time between any two points on the surface of the earth, especially between cities.

A still further object of the invention is to provide a means which will assist the pupil in learning some of the elementary principles of astronomy, provision being made for arranging the names of the months of the year in relation to the signs of the zodiac to show the relative positions of the constellations.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
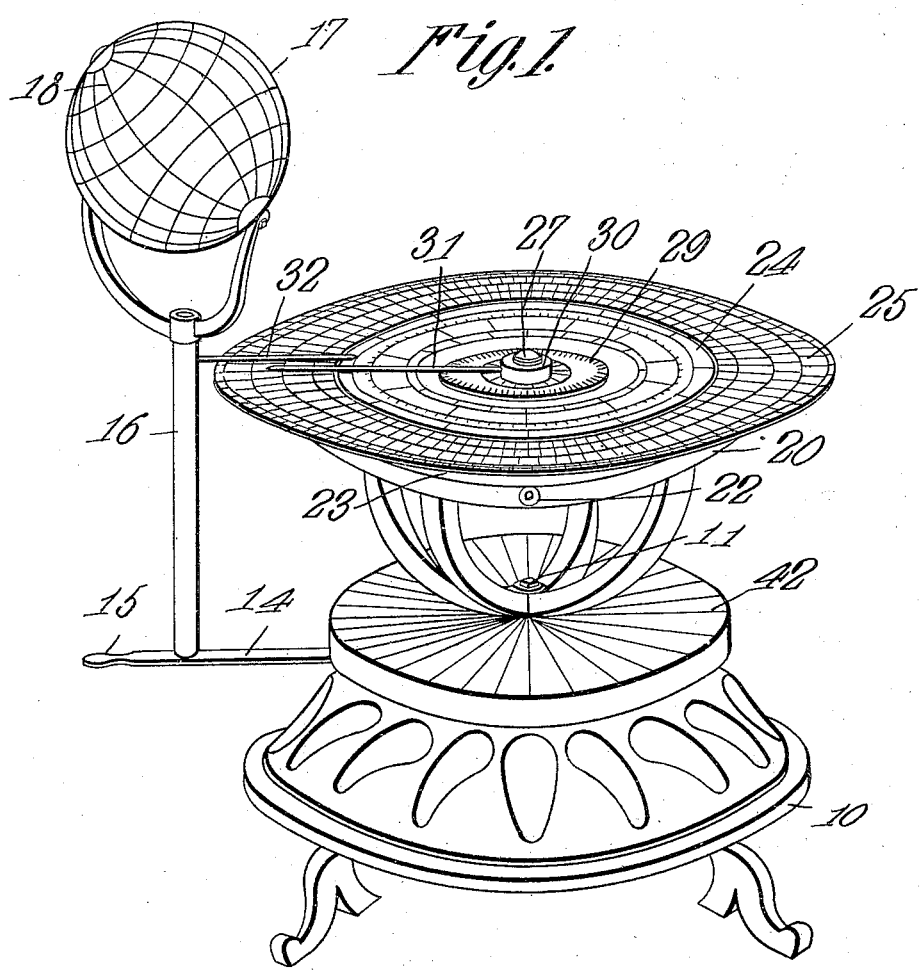
Figure 2:
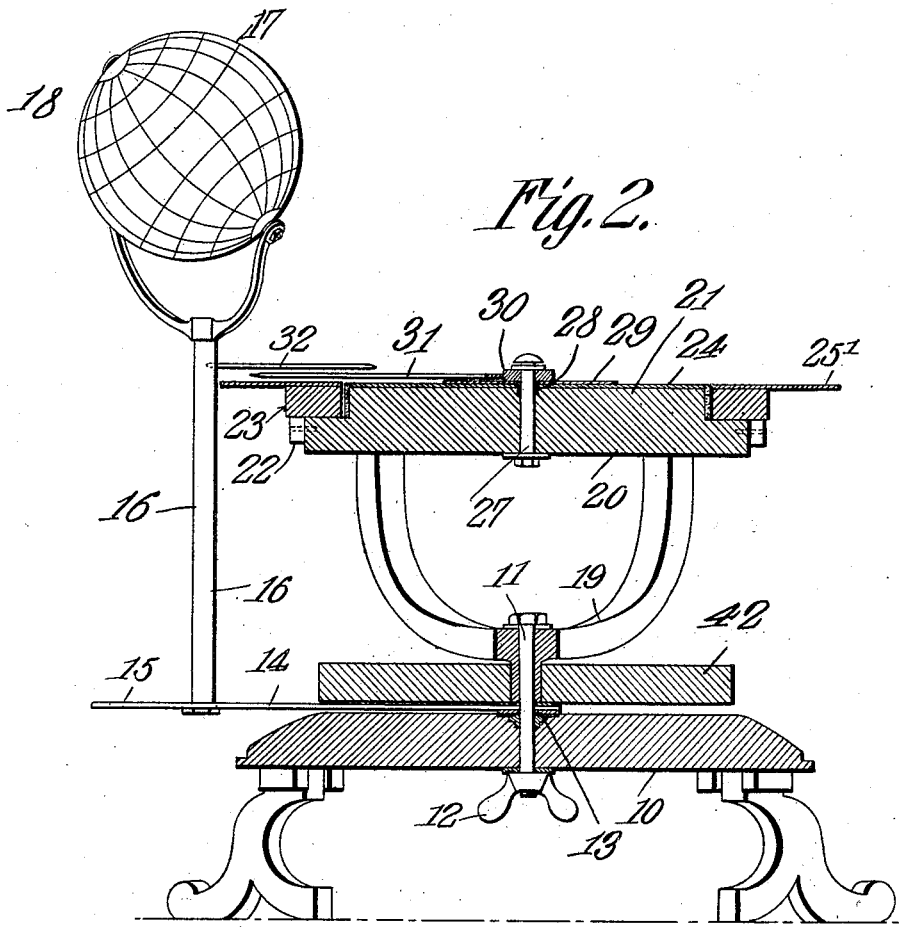
Figure 3:
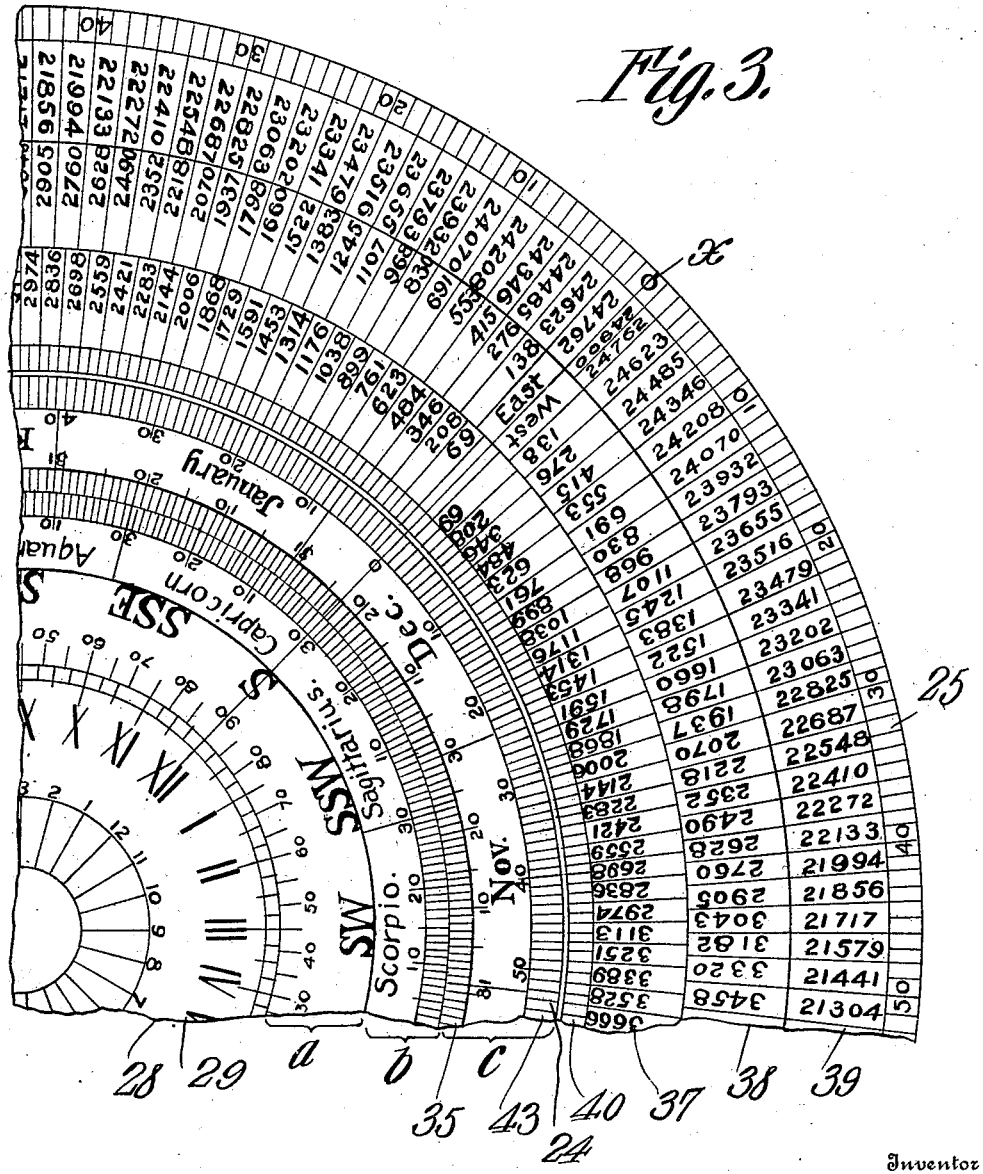

In the accompanying drawings:—Figure 1 is a perspective view of an apparatus constructed in accordance with the invention. Fig. 2 is a vertical section of the same. Fig. 3 is a plan view of a portion of the main tables or dials drawn on an enlarged scale.

The apparatus is mounted on a suitable base 10 at the center of which is a vertically arranged bolt 11 that carries a wing nut 12 for clamping the bolt. Mounted on the bolt is a pair of small disks or collars 13 which are arranged to form pivotal supports for the inner end of a lever 14, the outer end of said lever being shaped to form a handle 15. From this lever rises a standard 16 carrying an earth globe 17 that is mounted in the usual manner and is provided with meridians 18 for measuring, and accurately showing the position of various points on the surface of the globe.

On the upper end of the bolt 11 is arranged the central hub of a spider frame 19 which carries a disk 20, the spider frame being clamped in position by means of the wing nut 12 when the disk has been adjusted to the desired position, this being of advantage when the base has been set by compass, although it is not absolutely essential to the proper use of the device that the base be so set, although it is, of course, always advisable in a device of this character that the cardinal points be set in proper position in order to avoid confusing the pupil.

The upper portion of the disk 20 is turned down to form a smaller disk 21, and at the periphery of the disk 20 are arranged a number of antifriction rollers 22 which serve for the reception and support of a ring 23 which fits close around the periphery of the disk 21, and which may be readily turned on the supporting rollers.

The different tables and graduations used may be marked directly on the upper surfaces of the disk 21 and ring 23, but for convenience the disk 21 is shown as carrying a metallic disk 24, and the ring 23 carries a metallic ring 25, and on these metallic surfaces are printed or otherwise marked the main tables and graduations relied upon in the operation of the device.

Extending through the disks 20 and 21 is a vertical bolt 27, the axis of which is in vertical alinement with the axis of the bolt 11 and this bolt 27 carries a small sleeve or collar 28 on which is mounted a disk 29, the latter being provided with graduations and indicating marks representing divisions of time. On the upper portion of the bolt is a collar 30 carrying a hand or pointer 31 that extends out radially over the disks 29 and 24 and the ring 25. A second hand or pointer 32 is carried by the upper portion of the standard 16 and projects over the hand 31 so that the hands may be independently operated without coming into contact with each other.

The center disk 29 is divided into twenty-four equal spaces bearing Roman characters indicating the hours from 1 to 12 a. m. and also the hours 1 to 12 p. m., and these are further subdivided by smaller marks representing quarter or other fractional periods of an hour. The disk further carries a second inner circle of figures representing twenty-four hours, these running anti-clock-wise.

That portion of the disk 24 outside of or beyond the edge of the disk 28 is divided into three main concentric circles $a$, $b$, and $c$, the inner circle $a$ being graduated and provided with the usual compass marks, such as N., S., E., and W., together with numerous intervening marks for indicating direction between the cardinal points. This circle is also subdivided into graduations as indicated at $d$, and these extend on both sides from the east and west marks to the north and south marks, the numbers running from zero to ninety inclusive.

The circle $b$ is divided into twelve separate divisions each of a value of 30° and bearing the names of the signs of the zodiac.

The outermost circle $c$ is divided into twelve arcuate spaces bearing the names of the months of the year, and the lengths of these spaces depend on the number of days in the month, the spaces bearing the names of February, April, June and November being smaller than the spaces bearing the names of the remaining months of the year. And each of these spaces is provided with a row of indicating marks 35 showing the number of days in the month. Thus it will be seen on reference to Fig. 3 that the space bearing the abbreviation designating the name November has been subdivided into thirty equal spaces, while the spaces for January and December have been divided into thirty-one equal spaces each.

The names of the months are arranged in proper relation to the signs of the zodiac, thus for instance, Scorpio and Sagittarius being autumn signs are marked opposite November and a portion of December, while Capricornus and Aquarius, winter signs, are marked opposite a portion of December and all of January and a portion of February. The remaining signs are properly distributed, Aries, Taurus and Gemini being opposite that period from March 21 to June 21, while Cancer, Leo and Virgo are opposite the period from June 21 to September 22, so that the pupil may be readily taught the relation between the months names or periods and the signs of the zodiac. In this connection also the earth globe may be rotated by grasping the handle 15 and swinging the lever 14 around with the lower bolt as a center so that the hand or pointer 32 may be brought opposite any month, day of the month, or zodiacal sign.

The outer or distance ring 25, as it may be termed, is provided with three circular rows of tables 37, 38 and 39 each of which runs in opposite directions from a zero point $x$. The innermost rows 37 and 38 are to be read together and these rows are divided, in all, into 360 spaces, each of which represents two degrees of longitude or latitude, there being 180 subdivisions in each row, and it will be seen on reference to Fig. 3 that the degree indicating marks 40 are so arranged that the marks of the first, third and alternate degrees may be read in the innermost row 37, while for the second, fourth, sixth, eighth and alternate even figures the marks may be read in the second row 38.

The tables are, of course, only approximate and are based on the distance between the degrees of longitude at the equator, that is to say approximately, 691/6 English miles to each degree. These tables therefore will run from 69 miles, indicating approximately one degree, to a point diametrically opposite the zero mark where the highest number is 12,450 indicating a distance of 180° of longitude at the equator, each degree being 691/6 English miles.

The outer circle 39 starts from the end of the innermost row and runs in opposite directions from the highest number of the innermost row in both directions back to zero where the highest number is 24,900, approximately the circumference of the earth in English miles. This latter row of figures is used in measuring distances involving more than 180° so that the distance between any two points from east to west may be measured around the globe, as for instance, the distance from Chicago to New York traveling westward, while at the same time the shortest distance traveling eastward might also be measured. It may be here remembered, however, that the measuring is not accurate, except for points on the equator and the distance measured is rather between the degrees of longitude or latitude than between any two cities or points.

Mounted on the hub of the spider 19 is a disk 42 bearing the names of the principal cities of the world or other points and giving their exact longitude and latitude. This is intended merely as an aid to the pupil, and for convenient reference, inasmuch as the exact longitude or latitude of any point of the globe may be accurately measured by the meridians.

In using the device say it is desired to ascertain the distance between Alexandria, Egypt and the city of Mexico, that is to say, the distance between the degrees of longitude in which said cities are situated. Alexandria is located at 30° east longitude and the city of Mexico at 99° west longitude. To solve this problem the zero point of the distance ring is moved opposite that one of the row of graduations 43 of the disk 21 indicating 30° east of south. The hand or pointer 31 is then moved to this position. The time indicating dial is then turned so that the XII mark is under the pointer. The pointer is then turned to the west until it is over or above the ninety-ninth degree west of south and the pointer will then be over that graduation of the inner circle 37 which is marked 8,923 showing the approximate distance in English miles between 30° east longitude and 99° west longitude at the equator. At the same time the hand or pointer 31 will show its relation to the time indicating dial, that there is a difference in time of eight hours, thirty-six minutes, so that when it is noon at Alexandria it is 3:24 a. m. of the same day in the city of Mexico. Taking another example from Calcutta, India 88° east longitude to New Orleans, Louisiana 90° west longitude we proceed as before and find the distance to be 12,312 miles equatorial distance and the difference in time eleven hours and fifty-two minutes, so that when it is noon at Calcutta it is eight minutes after midnight of the same day at New Orleans.

If it is desired to measure the distance between two cities that are located more than 180° apart measuring in one direction we may take the longitude of Pekin, China 116° east and the longitude of St. Louis, Missouri 90° west. Proceeding as before and turning the indicator from 116° east longitude to 90° west longitude, the indicator has passed over 206° and will show a difference in time of thirteen hours and forty-four minutes, that is to say, when it is six o'clock a. m. in St. Louis it is seven o'clock forty-four minutes p. m. in Pekin of the preceding day in Pekin, and the distance is 14,248 miles from east to west, but from west to east the distance is but 10,652 miles.

In order to ascertain the distance between degrees of latitude, for instance the distance between two points such as St. Petersburg, Russia 60° north latitude and Cape Town, Africa 34° south latitude the zero point of the distance ring is moved opposite 60° north of east in the row $x$ and then the hand or pointer 31 is moved to a point opposite 34° south of east when it will be seen that the distance between the two points is 6,502 miles. In similar manner the distance between Boston 42° north latitude to Valparaiso, South America, 33° south latitude may be measured as 5,188 miles.

What is claimed is:—

1. In apparatus of the class described, a disk bearing marks indicating the points of the compass and degrees of longitude, a ring encircling the disk and adjustable relatively thereto, said ring having a zero mark and also bearing degree marks and being provided with tables running in opposite directions from a line coincident with the zero degree mark of the ring, and indicating the distance between degrees of longitude at the equator, and a hand or pointer movable over the disk and ring to properly aline the degree marks of the disk with the distance tables of the ring.

2. In apparatus of the class described, a compass disk having marks indicating degrees of longitude, a time indicating disk arranged centrally of the compass disk and adjustable relatively thereto, said time indicating disk bearing two sets of numerals from one to twelve inclusive, to indicate the twenty-four hours of a day, a ring encircling the compass disk and adjustable relatively thereto, said ring having a zero mark and being provided with degree indicating marks and bearing distance indicating tables opposite the degree marks, the tables running in opposite directions between two diametrically opposite points on the ring and being disposed in a plurality of concentric rows, and a hand or pointer movable over the two disks and the ring.

3. In apparatus of the class described, a compass disk having marks indicating degrees of longitude, a time indicating disk arranged centrally of the compass disk and adjustable relatively thereof, a distance indicating ring arranged outside the compass disk and adjustable relatively thereto, said distance ring being divided by degree indicating marks into spaces, and the spaces being further divided into three concentric rows, the two innermost rows bearing marks indicating the distances between single degrees of longitude at the equator throughout half the circumference of the earth, and the remaining row bearing numerals indicating greater distances up to the full circumference of the earth.

4. In apparatus of the class described, a compass disk bearing marks indicating direction, and two sets of marks indicating degrees of longitude, one set having, also, numerals of gradually increasing value extending in opposite directions from a point in alinement with the south mark of the disk, and the other bearing numerals of gradually increasing value in opposite directions from the east and west marks of the disk, a time indicating disk arranged centrally of the compass disk and adjustable relatively thereto, a distance indicating ring arranged outside the compass disk and adjustable relatively thereto, said distance ring having marks indicating degrees of longitude, and being further provided with tables indicating the distances between degrees of longitude at the equator, and a hand or pointer movable over the two disks and ring.

5. In an apparatus of the class described, a base, a pivot bolt supported thereby, a spider frame mounted on the bolt and having an elongated hub, a disk supported by the spider frame, a plurality of anti-friction rollers carried by said disk and extending beyond the periphery thereof, a compass disk mounted on the frame disk and of smaller diameter than the latter, a ring encircling the compass disk and supported by the rollers, a pivot bolt extending through the two disks, a time indicating disk mounted on the said pivot bolt and adjustable relative to the compass disk, a hand also mounted on the pivot bolt and adjustable over the two disks and the ring, and a disk mounted loosely on the said hub of the spider frame and provided with marks indicating the latitude and longitude of various cities.

In testimony whereof I have signed my name to this specification in the presence of two subscribing witnesses.

CHARLES ALBERT IFFERT.

Witnesses:
 ERNST HOESLY,
 JOSEPH WILLIMANN.